(12) United States Patent
Lee

(10) Patent No.: US 10,222,682 B2
(45) Date of Patent: Mar. 5, 2019

(54) UNDERWATER PHOTOGRAPHIC LIGHTING DEVICE

(71) Applicant: I-DIVESITE CO. LIMITED, Kowloon, Hong Kong (CN)

(72) Inventor: Kwok Hang Lee, Hong Kong (CN)

(73) Assignee: I-DIVESTE CO. LIMITED, Kowloon (HK)

( * ) Notice: Subject to any disclaimer, the term of this patent is extended or adjusted under 35 U.S.C. 154(b) by 0 days.

(21) Appl. No.: 15/542,881

(22) PCT Filed: Oct. 18, 2016

(86) PCT No.: PCT/CN2016/102414
§ 371 (c)(1),
(2) Date: Jul. 11, 2017

(87) PCT Pub. No.: WO2017/071501
PCT Pub. Date: May 4, 2017

(65) Prior Publication Data
US 2018/0011388 A1  Jan. 11, 2018

(30) Foreign Application Priority Data
Oct. 27, 2015  (HK) ................................. 15110578.2

(51) Int. Cl.
*F21L 4/00*  (2006.01)
*F21V 25/00*  (2006.01)
(Continued)

(52) U.S. Cl.
CPC ................. *G03B 15/05* (2013.01); *F21L 4/00* (2013.01); *F21V 7/04* (2013.01); *F21V 21/406* (2013.01);
(Continued)

(58) Field of Classification Search
CPC ... F21L 4/00; F21L 4/005; F21L 4/022; F21L 4/027; F21L 4/04; F21L 4/045;
(Continued)

(56) References Cited

U.S. PATENT DOCUMENTS 5,013,918 A * 5/1991 Choi ...................... B82Y 20/00
250/338.4
5,142,299 A * 8/1992 Braun ...................... G02B 7/32
396/107

(Continued)

FOREIGN PATENT DOCUMENTS

CN        101389895 A    3/2009
CN        204166262 U    2/2015
(Continued)

*Primary Examiner* — Jason M Han
(74) *Attorney, Agent, or Firm* — Muncy, Geissler, Olds & Lowe, P.C.

(57) ABSTRACT

The present invention relates to an underwater photographic lighting device which comprises: a flashlight body fully sealed by a seal, the interior of the flashlight body is provided with waterproof through holes, the flashlight body is respectively connected to a lamp head and a flashlight via conductive connecting cables, the lamp head is sealed by a seal, and connecting parts can be respectively dismounted from the flashlight body; and a power supply component sealed by a seal and connected to the flashlight body. Every part of the underwater photographic lighting device of the present invention is sealed, so the waterproof function is better; and each part is independent, and therefore can be optionally replaced and maintained. The battery module can be replaced and upgraded according to future need, and can be independently charged, so that the life cycle of the whole device is extended. When a beam head is used for photographing, a reflection cup and a condensing lens that are added on the beam head can increase light efficiency, so that a better photographing and recording effect can be achieved.

(Continued)

In addition, since the device can be connected to a camera or a camcorder without a grip, a clamp or other parts, the device is convenient, light in weight and practical.

7 Claims, 5 Drawing Sheets

(51) Int. Cl.
*F21V 31/00* (2006.01)
*G03B 15/05* (2006.01)
*G03B 17/08* (2006.01)
*F21V 7/04* (2006.01)
*F21V 21/40* (2006.01)
*F21Y 115/10* (2016.01)

(52) U.S. Cl.
CPC ............ *F21V 31/005* (2013.01); *G03B 17/08* (2013.01); *F21Y 2115/10* (2016.08); *G03B 2215/056* (2013.01); *G03B 2215/0542* (2013.01); *G03B 2215/0567* (2013.01); *G03B 2215/0582* (2013.01)

(58) Field of Classification Search
CPC .. F21L 4/06; F21V 7/04; F21V 21/406; F21V 31/005; G03B 15/02; G03B 15/03; G03B 15/04; G03B 15/041; G03B 15/05; G03B 15/0514; G03B 15/0517; G03B 15/0564; G03B 15/0567
USPC ............... 362/3–18, 158, 183–208, 267, 645
See application file for complete search history.

(56) References Cited

U.S. PATENT DOCUMENTS 6,061,522 A    5/2000  Inoue et al.
9,512,969 B1 * 12/2016  Watson .................. G03B 15/02

FOREIGN PATENT DOCUMENTS

CN        104702831 A    6/2015
JP        2001033852 A   2/2001

* cited by examiner

UNDERWATER PHOTOGRAPHIC LIGHTING DEVICE

TECHNICAL FIELD

The present invention relates to a lighting device for photographing, and specifically, the present invention discloses a lighting device for underwater photographing or video recording, such as a flashlight device.

BACKGROUND ART

When a camera is used to take pictures or shoot a video underwater, a separate lighting device, such as a video LED lamp and flashlight suite, must be separately carried, so that video recording and photographing can be continuously carried out. Obviously, it's very heavy and troublesome, increasing the burden of a user. Moreover, conventional underwater flashlights all use alkaline or nickel-metal hydride batteries, the alkaline or nickel-metal hydride rechargeable batteries are short in service duration due to less energy, and cannot be used on high-power LED lamps, and moreover, if the conventional underwater flashlights need to be upgraded in the future, high-power batteries cannot be used as well.

In order to improve the above-mentioned problems, people have made considerable improvements. For example, the Chinese utility model patent ZL201220609694.5 discloses a submersible lamp, which comprises a lamp body, a light-emitting part is arranged in the lamp body, light-sensing parts which are configured to sense environmental light and control the light-emitting part are arranged on the lamp body, the lamp body is provided with mounting hole for the mounting of the light-sensing parts, and the light-sensing parts are mounted in the mounting holes. As the light-sensing parts for sensing environmental light are arranged on the periphery of the lamp body, during underwater photographing, as soon as the light-sensing parts on the lamp body sense the light of a camera flashlight at the moment when the camera flashlight flashes, the light of the submersible lamp itself can be automatically turned off, consequently, its light is prevented from affecting the exposure of photographing, and moreover, light compensation is provided for photographing, so that a shot picture can be clear. Although the technical solution can provide underwater lighting and perform flashing, the problems mentioned above have not yet been solved.

Therefore, it is necessary to design a novel lighting device for photographing, not only does the novel lighting device for photographing have the conventional underwater use function, but also every sealed part therein can be optionally replaced, a mounted power supply can be upgraded according to the development of technology without requiring the complete replacement of the entire device, so that the burden of users can be decreased, and moreover, the underwater lighting effect is made better.

SUMMARY OF THE INVENTION

The objective of the present invention is to solve the above-mentioned various technical problems existing in the prior art to provide a novel underwater photographic lighting device, which is modularly assembled, not only does the underwater photographic lighting device have the conventional underwater use function, but also every sealed part therein can be optionally replaced, a power supply can be upgraded according to the development of technology without requiring complete replacement, and moreover, the underwater lighting effect is made better.

In order to achieve the above-mentioned objective, the present invention adopts the following technical solution: disclosed is an underwater photographic lighting device, which is characterized in that the device comprises:
a flashlight body fully sealed by a seal, wherein the interior of the flashlight body is provided with through holes through which connecting cables can pass;
a lamp head comprising a bulb, the lamp head is sealed by a seal, and is detachably connected to the flashlight body; and
a power supply component sealed by a seal and connected to the flashlight body to supply power to the flashlight and the lamp head.

In the underwater photographic lighting device of the present invention, the bulb is an LED lamp or other lighting bulbs.

In the underwater photographic lighting device of the present invention, the lamp head is directly connected to the power supply component, so that an LED lamp is obtained, wherein the LED lamp comprises a circuit board and an LED driving board.

In the underwater photographic lighting device of the present invention, the underwater photographic lighting device comprises an infrared controller, and the infrared controller is connected to the flashlight body through an optical fiber cable, so that the underwater photographic lighting device can be remotely controlled. In one embodiment, the device further comprises an LCD display screen to facilitate control.

In the underwater photographic lighting device of the present invention, the power supply module is a replaceable battery pack, e.g. a lithium ion battery.

In the underwater photographic lighting device of the present invention, the underwater photographic lighting device comprises a connecting adapter, which is connected to the battery pack and the lamp head, turning the lamp head into a self-contained lamp.

In the underwater photographic lighting device of the present invention, the underwater photographic lighting device comprises a handle, one end of which is connected to the flashlight body and the other end of which is connected to a camera.

In the underwater photographic lighting device of the present invention, the seals are O-shaped rings.

In the underwater photographic lighting device of the present invention, the underwater photographic lighting device comprises a reflection cup, which is arranged at the front end of the flashlight body to condense a beam.

In the underwater photographic lighting device of the present invention, the reflection cup is provided with an optical fiber beam-condensing part and a condensing lens to increase light efficiency, so that light intensity is higher than that of ordinary condensed beams.

Every part of the underwater photographic lighting device of the present invention is sealed, so the waterproof function is better; and each part is independent, and therefore can be optionally replaced and maintained. The battery module can be adjusted and replaced according to need, and can be separately charged, prolonging the service cycle of the whole device. The added reflection cup and condensing lens can make the effect of shot and recorded condensed-beam pictures better. The added adapter can elongate the path of illumination by connection, and can enable light to illuminate every dark dead corner, so that a shot picture or video can be more lifelike and real. The entire device can be connected to a camera or a camcorder without an additional part, such as a grip or a clamp, and therefore is convenient and practical.

BRIEF DESCRIPTION OF THE DRAWINGS

In order to more clearly describe the present invention, the present invention is elaborated in detail below in reference to the drawings.

DETAILED DESCRIPTION OF THE INVENTION

Figure 1:
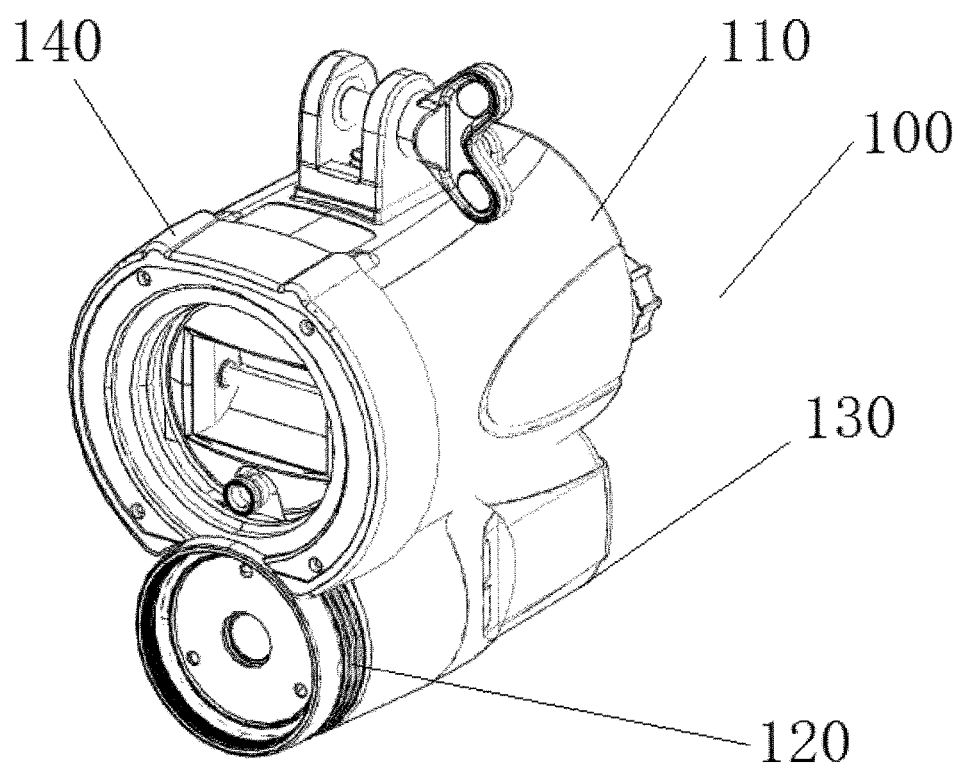
FIG. 1 shows an overall structural schematic diagram of an underwater photographic lighting device of the present invention.
Figure 2:
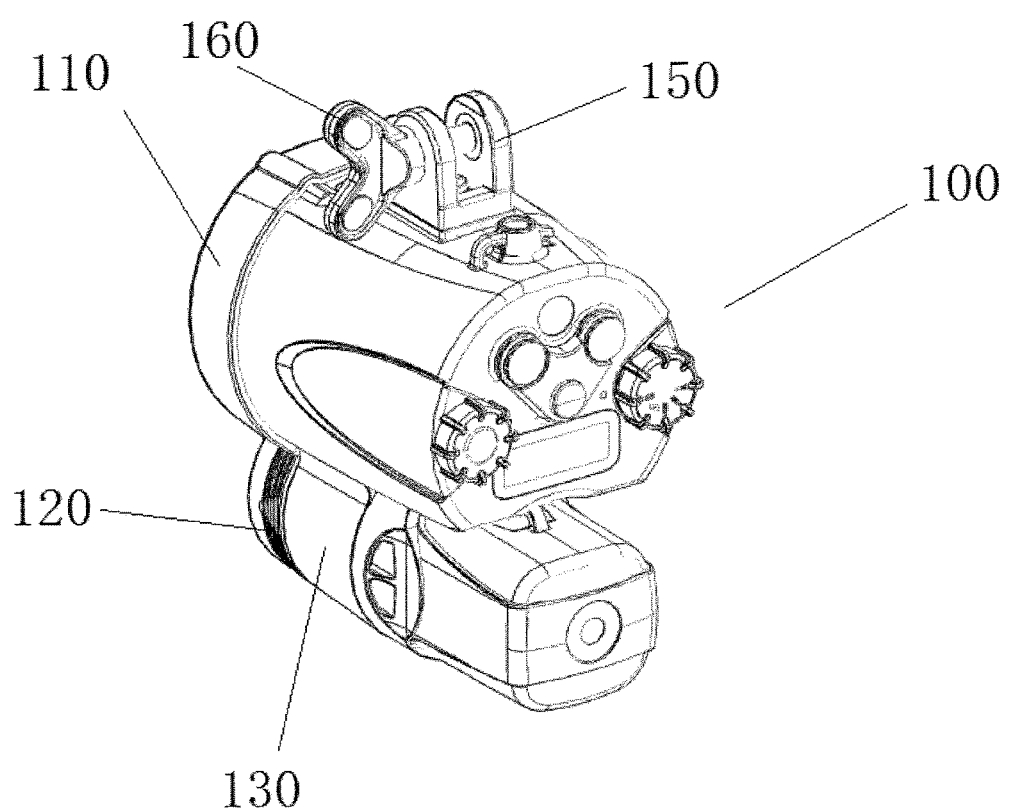
FIG. 2 shows a structural schematic diagram of another direction of the underwater photographic lighting device of the present invention.

Preferred embodiments of the present invention are given below in reference to the drawings in order to describe the technical solution of the present invention in detail.

Refer to FIG. 1 to FIG. 5, an underwater photographic lighting device 100 of the present invention comprises the following connected separate parts: a flashlight body 110, a lamp head 120 and a power supply component 130.

The flashlight body 110 is fully sealed by a seal, wherein the interior of the flashlight body is provided with a plurality of sealed through holes for the insertion of the internal electrical connection of the whole device 100. The body 110 is provided with a connecting device for another part, such as a connecting part for a grip 190, which comprises a fixing part 150 and a fixing screw 160, and the part is inserted in the fixing part 150, and is then fixed by the screw.

The lamp head 120 comprises a bulb, is sealed by a seal, and can be detachably connected to the flashlight body 110 at any time. Preferably, the lamp head 120 adopts an LED lamp for lighting in order to increase brightness and reduce energy consumption. The LED lamp comprises a circuit board, an LED driving board, and other necessary electronic elements, so that the LED lamp can be lit under the condition of applying voltage.

The power supply component 130 is sealed by a seal, and is connected to the flashlight body 110 to supply power to the flashlight and the lamp head 120 and light the LED lamp when needed. The battery module 130 of the present invention uses lithium ion battery blocks with higher voltage rather than conventional alkaline batteries, and not only can the lithium ion batteries be repetitively used, but also a plurality of lithium ion batteries can be connected in series to obtain higher voltage to drive the LED lamp and flashlight of the present invention. After the battery technology has developed, instead of discarding the whole lighting device, only the batteries themselves need to be replaced, and thereby the economic burden of users is decreased.

Because the above-mentioned parts of the present invention are independent, if one of the parts goes wrong or is damaged, the part can be dismounted and replaced or repaired.

Figure 3:
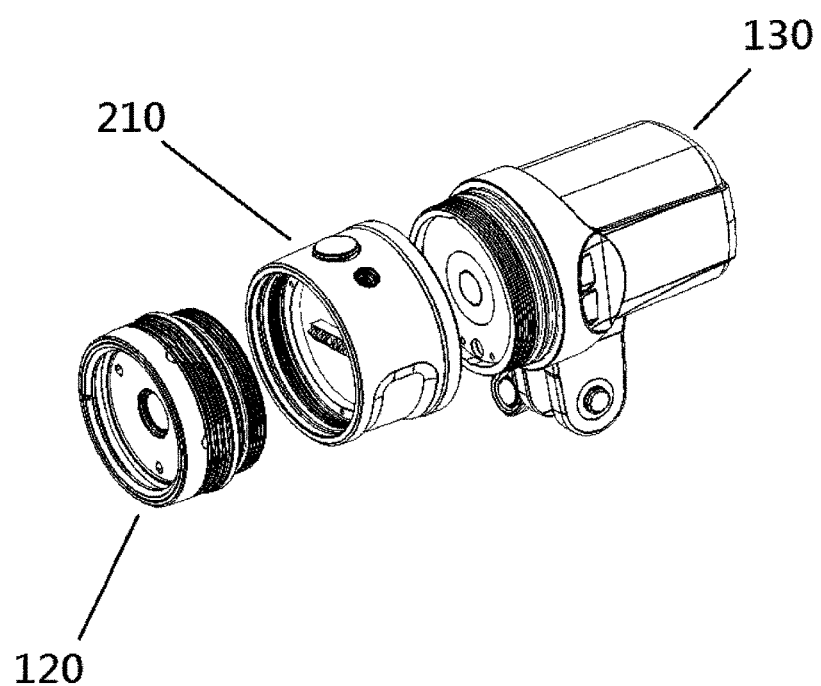
FIG. 3 shows an exploded structural schematic diagram of the underwater photographic lighting device as a lamp of the present invention.

Further, refer to FIG. 3, the battery module 130 and the lamp head 110 of the present invention can be directly connected or the battery module 130 and the lamp head 110 can be connected through an adapter 210, and can be used as a lamp alone for lighting under the condition that the flashlight is not used, and thereby the practicability of the present invention is greatly increased.

All the above-mentioned parts of the present invention are watertight, and preferably, the seals adopted for sealing, such as O-shaped rings for sealing, ensure that water cannot get into the device, so the device can be used under water. The interior of the device is provided with a small hole for ventilation to keep air pressure balance. For example, under an extreme condition, for example, when water gets into the battery holder, the water will be in contact with the anodes and cathodes of the batteries, and at this moment, water electrolysis will take place, producing gas to generate powerful gas pressure. The small hole in the device and adhesive for sealing can balance gas pressure in the battery holder, that is, the gas pressure can burst through the adhesive, so that gas is exhausted out of the lamp head via the arranged small hole, and thus gas pressure balance is kept. However, as the small hole itself is tiny, water won't enter the device from the outside, and thereby an optimal waterproof effect is ensured.

Because conventional beam-condensing photography does not have coaxial illumination, a target can only be hit by experience plus estimation every time during shooting. In order to help a user accurately hit a shot target with a fine beam as beam-condensing photographing is performed, the underwater photographic lighting device 100 of the present invention comprises a reflection cup (not shown in the drawings), an optical fiber beam-condensing part 182 and a condensing lens (not shown in the drawings) adapted thereto, which are fixedly connected to the front end of the flashlight body 110 through a screw 181, and normally, any strong-light lighting flashlight 180 is used to provide light for lighting. After the device is added, for example, if the flashlight is lit, after being reflected by the reflection cup of the flashlight 110, light then returns to the optical fiber beam-condensing part 182 and gets out, the light reflected back can be used for illumination under the coaxial guide of an optical fiber, the beam can be accurately aimed at a target object before shooting, and thus the hit rate of photographing or recording is increased to 100 percent.

In order to elongate the path of illumination, a connecting adapter 170 is arranged on the body 110, the LED lamp head is connected to the body 110 through the adapter, so that the LED lamp can be extended to farther places which cannot be illuminated under normal conditions, such as narrow places and dark dead angles, and a more real vision can be shot. Preferably, two adapters 170 are arranged on the body 110 to connect with a plurality of LED lamp heads for more effective illumination.

Figure 4:
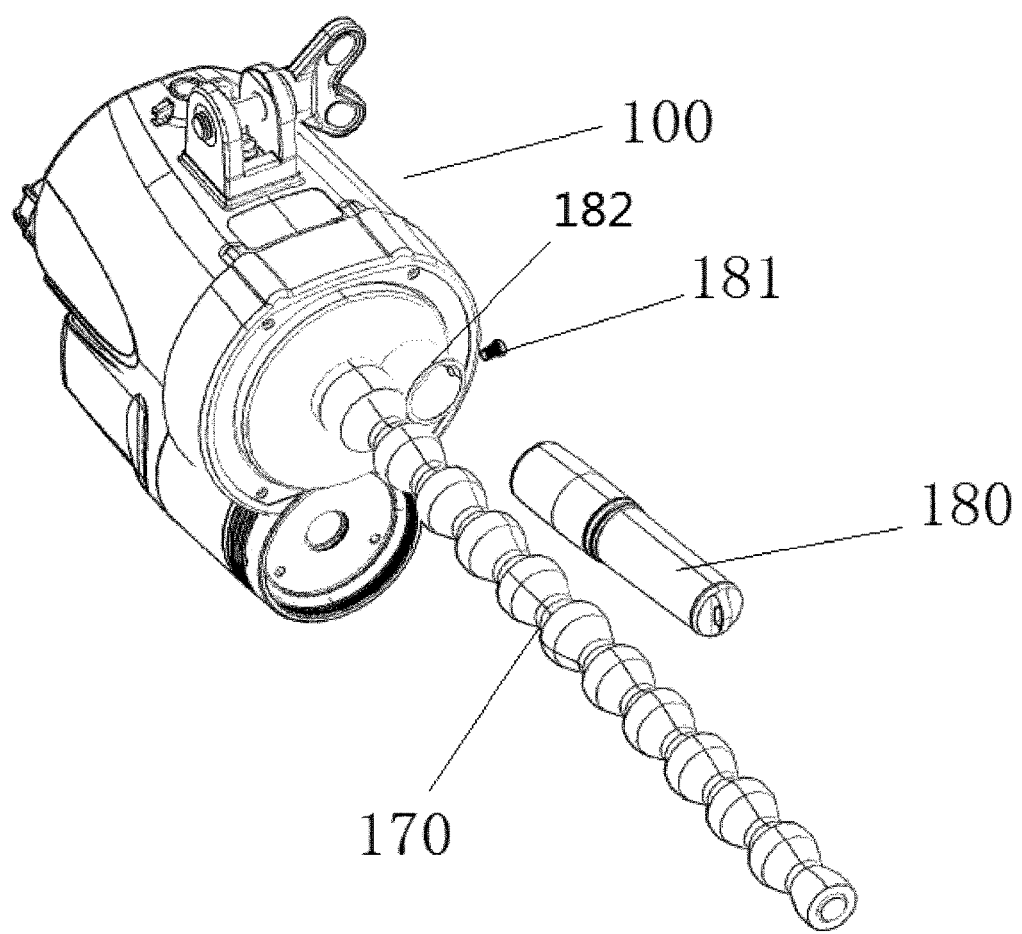
FIG. 4 shows a structural schematic diagram of the underwater photographic lighting device of the present invention, wherein a reflection cup and a connecting adapter are added on the device.
Figure 5:
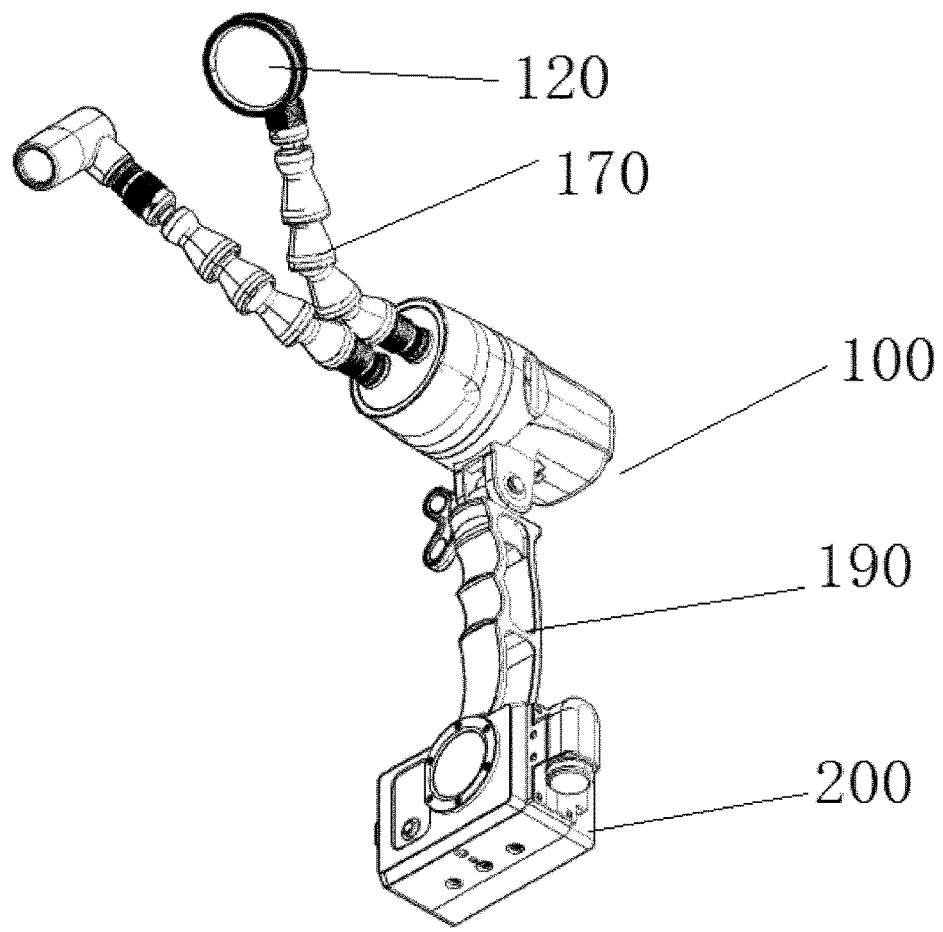
FIG. 5 shows a structural schematic diagram of the underwater photographic lighting device of the present invention, wherein a grip is added on the device, and the state of connection with a camera is shown.

Further, refer to FIG. 4, the grip 190 is arranged at one end of the body 110, the other end is used to be connected to a camera 200 or a camcorder, for example, the parts 150 and 160 are utilized for fixed connection. Thus arrangement can allow different LED lamps to be mounted, different angles and heights can be adjusted for illumination, and the lighting device can be operated without an additional fixed arm system and clamp.

Preferably, the underwater photographic lighting device 100 comprises an infrared controller (not shown in the drawings), and the infrared controller is connected to the flashlight body 110 through an optical fiber cable, so that the underwater photographic lighting device can be remotely controlled. In one preferred embodiment, the device 100 further comprises an LCD display screen in order for the user to conveniently observe and operate and remotely control the lighting device of the present invention under water, and thereby convenience is increased.

Every part of the underwater photographic lighting device of the present invention is sealed, so the waterproof function is better; and each part is independent, and therefore can be optionally replaced and maintained. The battery module can be adjusted and replaced according to need, and can be charged, prolonging the service cycle of the whole device. The added reflection cup and condensing lens can make the effect of photographing and recording better. The added adapter can elongate a lighting path by connection, and can enable light to illuminate every dead corner, so that a shot picture or video can be more lifelike and real. The entire device can be connected to a camera or a camcorder without an additional part, such as a grip or a clamp, and therefore is convenient and practical.

The specific embodiments mentioned above further describe the technical problems solved by the present invention, the technical solution and the advantages in details. It should be understood that what is described above is merely the specific embodiments of the present invention rather than is intended to limit the present invention, and any modifications, equivalent replacements, improvements and the like which are made within the spirit and principle of the present invention shall fall within the protection scope of the present invention.

The invention claimed is:

1. An underwater photographic lighting device, characterized in that the device comprises:

- a flashlight body, fully sealed by a seal, wherein an exterior of the flashlight body is provided with a plurality of connecting ports for optional connection with other devices including a camera;
- a lamp head, comprising a bulb, the lamp head is sealed by a seal, and is detachably connected to the flashlight body; and
- a power supply component, sealed by a seal, and connected to the flashlight body to supply power to the flashlight body and the lamp head and make the lamp head luminous.

2. The underwater photographic lighting device according to claim 1, characterized in that the bulb is an LED lamp.

3. The underwater photographic lighting device according to claim 2, characterized in that the lamp head is directly connected to the power supply component, so that the power supply component supplies power to the lamp head and lights the LED lamp, wherein the LED lamp comprises a circuit board and an LED driving board.

4. The underwater photographic lighting device according to claim 1, characterized in that the power supply component is a replaceable battery pack.

5. The underwater photographic lighting device according to claim 1, characterized in that the underwater photographic lighting device is connected to the power supply and the lamp head through a connecting adapter, thus forming a self-contained underwater lamp.

6. The underwater photographic lighting device according to claim 5, characterized in that the underwater photographic lighting device comprises a handle, one end of which is connected to the flashlight body and the other end of which is connected to the camera.

7. The underwater photographic lighting device according to claim 1, characterized in that the seals are O-shaped rings.

* * * * *